Jan. 21, 1969          H. NERWIN          3,422,740

CODED FILM MAGAZINE

Original Filed Jan. 2, 1962          Sheet 1 of 2

HUBERT NERWIN
INVENTOR.

Jan. 21, 1969 H. NERWIN 3,422,740
CODED FILM MAGAZINE
Original Filed Jan. 2, 1962 Sheet 2 of 2

Hubert Nerwin
INVENTOR.

BY

ATTORNEYS

United States Patent Office 3,422,740
Patented Jan. 21, 1969

---

3,422,740
CODED FILM MAGAZINE
Hubert Nerwin, Rochester, N.Y., assignor to Eastman Kodak Company, Rochester, N.Y., a corporation of New Jersey
Application Jan. 2, 1962, Ser. No. 163,843, which is a continuation-in-part of application Ser. No. 109,294, May 11, 1961. Divided and this application Jan. 11, 1965, Ser. No. 424,482
U.S. Cl. 95—31
Int. Cl. G03b *19/04*
4 Claims This application is a division of my pending application Ser. No. 163,843, filed Jan. 2, 1962, now abandoned in favor of U.S. Patent application Ser. No. 424,615, filed Jan. 11, 1965, now U.S. Patent No. 3,260,182, issued July 12, 1966, the latter patent being a continuation-in-part application of U.S. Patent application Ser. No. 109,294, filed May 11, 1961, now U.S. Patent No. 3,194,132, issued July 13, 1965.

The present invention relates to photographic still cameras and roll film magazines for use therein and more particularly to film magazines for use with cameras and of the general type described in pending U.S. patent application Ser. No. 129,303, filed Aug. 4, 1961, in the name of Douglass C. Harvey, which issued June 23, 1964 as U.S. Patent No. 3,138,084. Still more particularly, the invention relates to film magazines, such as are described in my U.S. Patent No. 3,138,081, which issued June 23, 1964, and which comprises molded plastic components provided with physically detectable coding means indicative of the characteristics of the film in the magazine, e.g., the type and speed; and to the method of forming physically detectable coding means on film magazines.

In all but the very simplest cameras, means are provided for adjusting the shutter speed and/or the lens diaphragm opening to vary the exposure of the film. Regardless of the means used for determining or regulating the exposure, the speed or sensitivity of the particular film used in the camera must be taken into consideration. In lieu of using a light meter or a camera having a built-in photo-electric exposure control mechanism, the exposure adjustments are commonly made by reference to a simple table showing appropriate settings for film of a particular sensitivity under various conditions of illumination. Such tables are customarily supplied with the film. If, however, the camera user does not have the appropriate table when he takes a photograph, or, if he has forgotten the type of film in the camera, his film is apt to be improperly exposed.

To eliminate the need for a separate exposure table and to simplify the determination of proper exposure settings, many cameras are provided with devices which, when set to an index number corresponding to the sensitivity of the film being used, provide criteria for effecting proper shutter adjustments under various light conditions. A simple and common form of such a device comprises a movable dial attached to the camera which, when moved to a position corresponding to the type of film in the camera, indicates proper shutter settings for various light conditions. Similar dials may be located concentrically about the shutter mechanism in such a manner that aligning a movable pointer on the shutter control mechanism with a mark on the dial indicating a particular light condition causes the shutter to be appropriately adjusted. Such dials may also be provided with additional data, for example, to indicate the distance range within which flash pictures may be taken using the particular type of film in the camera with various types of flash lamps.

In more elaborate cameras, including those provided with built-in light meters or photo-electric exposure devices for automatically controlling the exposure mechanism, adjusting means are likewise provided which must be set in accordance with the speed or sensitivity of the film being used in order to achieve proper exposures. With all of these devices a common cause of faulty exposures arises from the failure of the photographer to correlate the adjustment means with the sensitivity rating of the film being used. To eliminate this error as well as the necessity for adjusting separate dials on cameras, a principal object of the present invention is to provide disposable factory loaded film magazines with mechanically detectable coding means indicative of the speed or sensitivity of the film therein for use with cameras adapted to utilize such magazines, such cameras having simple mechanisms for detecting the position of such coding means and for appropriately adjusting the exposure indicating or regulating mechanism of the camera in accordance therewith.

Previous attempts to code film magazines have involved providing a magazine with a rigid projection, the location or dimension of which is indicative of the type of film in the magazine. Where such magazines are adapted to be reloaded at the factory, it has also been suggested that this coding means be made movable to various coding positions to eliminate the need for sorting the used magazines and reloading them with the type of film for which they were originally coded. Such a requirement is, of course, eliminated by the disposable magazine of the present invention. An obvious disadvantage to all of the foregoing coding constructions resides in the additional elements and manufacturing steps required to produce a finished coded magazine. It is therefore another object of the present invention to simplify the construction of coded plastic film magazines by providing such a magazine with an integral member, various portions of which may be subsequently removed in a simple manner to provide a mechanically detectable coded indication of the type of film in the magazine.

Somewhat akin to the necessity of identifying the speed or sensitivity of the film in the magazine at the time it is exposed is the requirement that the film be identified according to its type in order to develop and process it correctly. By providing magazines with coding means, this step, which has previously been accomplished by visual inspection, may be carried out by automatic sorting equipment. The coding means indicative of the film speed are not alone sufficient to identify the film for processing since, for example, color film may have the same film speed rating as black and white film but must be processed by an entirely different procedure. It is therefore still another object of the present invention to facilitate automatic sorting of film magazines according to film type by providing such magazines with tactile film type coding means which may be similar to the coding means used for identifying the sensitivity of the film in the magazine.

Still another object of the present invention is to provide a method for forming a tactile coding means on a film magazine by the removal of portions of the magazine.

Other objects of the invention will appear from the following description, reference being made to the accompanying drawings in which.

Figure 1:
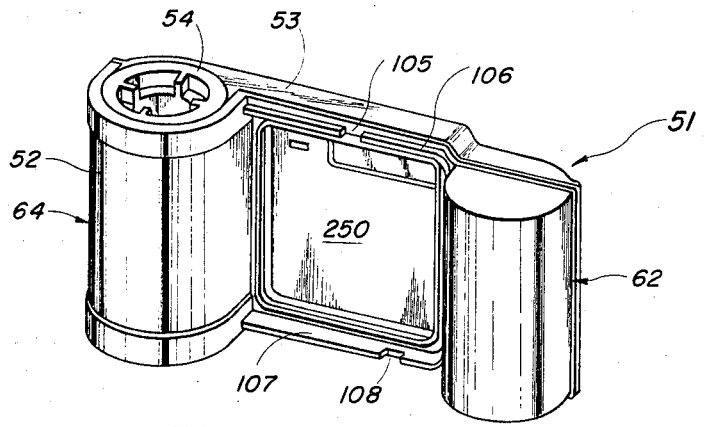
FIG. 1 is a perspective front view of a film magazine coding means.
Figure 2:
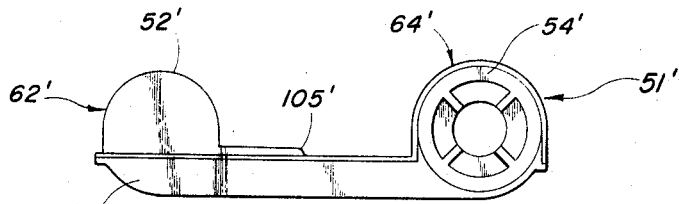
FIG. 2 is a top view of a film magazine showing an alternative embodiment of magazine coding means.
Figure 3:
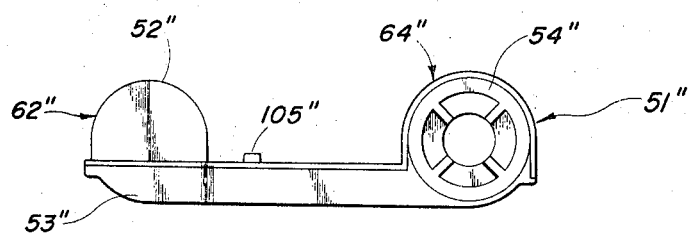
FIG. 3 is a top view of a magazine showing another alternative embodiment of magazine coding means.
Figure 4:
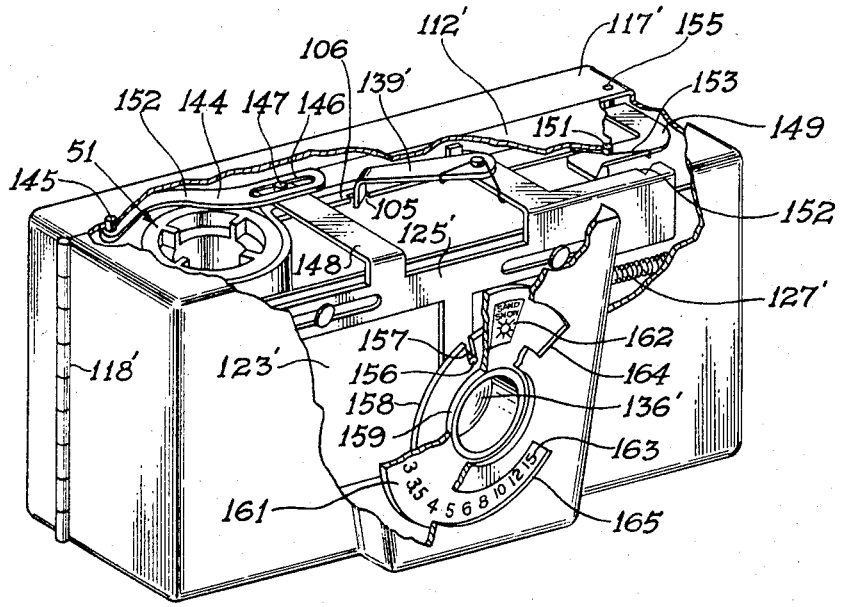
FIG. 4 is a perspective view of a camera with portions of the camera housing broken away to show a mechanism for adjusting an exposure indicating dial in response to the coding means on a magazine installed in the camera.

For a description of the interior construction of the film magazine shown in FIGS. 1 through 3 and indicated at 51 in FIG. 4, reference may be made to my U.S. Patent No. 3,138,081, which issued June 23, 1964.

In reference to FIGS. 1 through 3, 51 designates generally a loaded film magazine which comprises a molded plastic body 52, a molded plastic magazine cover or back 53, and a molded plastic spool 54. The film supply chamber 62 is formed by the cooperation of the magazine body and the magazine back and serves to hold film in the form of a scroll of film and backing paper (not shown). The film in the supply chamber is connected to the film spool chamber 64 across the channel-like member formed by body 52 and back 53 intermediate the film chambers 62, 64, by means of a leader of backing paper (not shown) which is connected to the film spool. The exposure opening along the film passageway and through which the film as it is drawn thereacross is exposed to scene light is shown at 250.

In order to enable an element of a camera to be automatically adjusted according to the sensitivity of the film in a magazine, a physically detectable coding means or tactile external discontinuity may be provided on the magazine as shown in a preferred embodiment in FIGS. 1 through 3. In FIG. 1, this coding means comprises a coding notch 105, the position of which along the forwardly projecting rib 106 of the film magazine is empirically determined as a function of the sensitivity or speed of the particular film loaded in the magazine. For example, as viewed in FIG. 1, the higher the film speed, the further notch 105 would be from the left end of rib 106. FIGS. 2 and 3 show alternate coding means in which the position of an abutment shoulder 105' or a projection 105" along the rib is determined by the speed of the film in the magazine.

It should be noted that all of these coding means comprise the removal of material from the rib rather than the addition of material, thereby affording a simple means of coding a standard magazine after it has been loaded with film. The removal of material from the rib is preferably accomplished by punching out a solid section or by locally melting the rib rather than by a sawing or grinding technique, in order to prevent contaminating the magazine with dust or shavings.

A second coding notch or similar means may also be provided on the magazine along rib 107 as shown at 108 in FIG. 1. The position of this coding means along the rib is empirically determined as a function of the type of film in the magazine in order that exposed magazines may be automatically sorted prior to being processed. If a greater range of values were to be coded along either of the ribs than would be practical by means of a single abutment surface, two or more such surfaces might be employed along the rib, for example, in a binary coding system.

Figure 5:
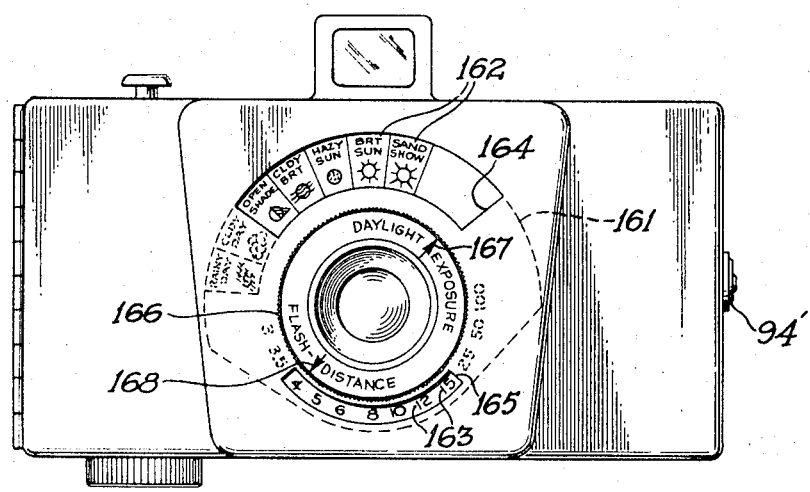
FIG. 5 is a front elevational view of the camera depicted in FIG. 4.

FIGS. 4 and 5 illustrate the mechanism and external construction of a simple camera in which an exposure guide scale is automatically adjusted in accordance with the speed of the film in the magazine installed in the camera.

The camera cover member 117' is hinged at 118' and is held in a closed position by a latch 94'.

A control plate 125' is slidably attached to a mechanism plate 123' by means of rivets and is urged to the right, as viewed in FIG. 4, by a spring 127'. The control plate 125' and the hinged cover member 117' are connected by a linkage member 144 pivotally attached to the cover member 117' by a pin 145 with a slot 146 in the linkage member in engagement with a stud 147 on arm 148 of the control plate. Thus, when the cover member is released by means of the cover latch 94' and is moved to its fully opened position parallel to the camera housing, the right end of slot 146 engages stud 147 and slides control plate 125' to its extreme left position, where it is held by a detent member 149 mounted on the top wall 112' of the housing by a pin 151 and urged into engagement with a notch 152 in the control plate by spring 153. In order to allow the cover member 117' to be fully opened, linkage member 144 is curved as shown at 152 to clear the cover hinge 118'.

With the cover in its open position, the coded film magazine 51 is then installed in the camera with the left end of the magazine rib 106 in engagement with pawl 139'. As the cover is then returned to its closed position, slot 146 allows linkage member 144 to move relative to pin 147 without disturbing the position of the control plate. During the final stage of the cover closing operation, after the magazine has been engaged by conventional spring members (not shown) on the cover, a detent release pin 155 on the cover engages detent member 149 and moves it out of engagement with notch 152 to allow the control plate to be moved to the right by spring 127' until the pawl encounters the coding means along rib 106. The pawl is pivotally mounted on the control plate 125'.

In this embodiment of the invention, the control plate is provided with a pin 156 in engagement with radial slot 157 in disk 158, which is rotatably mounted on the mechanism plate 123' by a sleeve member 159 coaxial with the camera lens aperture 136'. Thus the angular position of disk 158 is determined by the magazine coding means. A second disk 161 is attached to disk 158 for movement therewith and is provided with exposure and flash indicating symbols 162 and 163, which are visible through arcuate apertures 164 and 165 respectively of the camera housing. FIG. 5 illustrates, for example, the position assumed by the symbols for a hypothetical film speed represented by a coding notch in the intermediate portion of rib 106. The shutter control ring 166, which regulates the diaphragm opening and/or the shutter speed, as is well known in the prior art, is provided with a daylight exposure index mark 167, which, when aligned with the symbol corresponding to the existing light conditions effects a proper setting of the shutter. Thus, the symbols visible in FIG. 5 indicate that a proper exposure may be made under all light conditions ranging from "Open Shade" to "Sand or Snow," by aligning the index mark with the appropriate symbol. If the magazine were loaded with slower film, the coding notch would be further to the left so that, for example, only those symbols designating light conditions of "Hazy Sun," "Bright Sun," and "Sand or Snow" would be visible, thereby indicating that proper exposures would be possible only under such lighting conditions. Conversely, a magazine coded for film of high sensitivity would cause the disk to be rotated clockwise so that, for example, the symbols for "Rainy Day" and "Cloudy Day" would also be visible, thereby indicating that proper exposures could be made under these conditions.

To facilitate the use of the camera with flash lamps, the indicia visible through window 165 indicate the distance range within which an exposure may be made with film of the type in the magazine with a particular type of lamp, and provide a simple means for adjusting the shutter for optimum results at any distance within the permissible range. For example, the position of the flash guide indicia 163 in window 165 of the camera shown in FIG. 5 indicates that the shutter can be adjusted for a properly exposed flash illuminated photograph of an object within a range of four to fifteen feet from the camera by aligning the flash distance index mark 168 on ring 166 with the numeral representing the distance to the object.

Although the foregoing description relates to specific embodiments of the invention, it is obvious that variations and modifications thereof can be effected within the spirit and scope of the invention. Accordingly, the present disclosure is to be considered as illustrative and not as limiting the scope of the invention which is defined by the following claims.

I claim:
1. A method of providing a film magazine having an elongated external rib, with tactile code means representative of a particular film characteristic; said method comprising removing at least one portion of said rib to establish at least one abutment surface therealong at a position related to said particular film characteristic by a predetermined coding system.

2. A method of coding a film magazine provided with an elongated external plastic rib, said method comprising melting a portion of said rib to form therein a physically detectable discontinuity representative of a particular film characteristic according to a predetermined coding system.

3. A roll film magazine comprising enlarged spaced end portions defining film chambers; an intermediate channel-like member including front and back wall portions connecting and providing a film passageway between said chambers, said front wall portion provided with an exposure aperture between said chambers; and means integral with said front wall portion defining an abutment surface normal thereto at a position related to a particular film sensitivity by a predetermined coding system.

4. A roll film magazine for use in a camera, comprising:
a pair of chambers for receiving film and adapted to project forwardly into said camera and toward the lens aperture of said camera when loaded therein;
elongated external rib means extending between and joining said film chambers and adapted to project forwardly into said camera;
and tactile code means on the forward surface of said rib means, the position of said code means along the surface of said rib means being a function of a characteristic of the film contained in said magazine.

References Cited

UNITED STATES PATENTS

| | | | |
|---|---|---|---|
| 2,043,901 | 6/1936 | Mihalyi | 352—141 |
| 2,080,055 | 5/1937 | Martin | 352—72 |
| 2,137,801 | 11/1938 | Geibig | 29—557 X |
| 2,367,195 | 1/1945 | Bolsey | 95—31 |
| 3,087,388 | 4/1963 | Kuhar | 29—558 |

FOREIGN PATENTS 456,783  8/1944  Belgium.

NORTON ANSHER, *Primary Examiner.*

JOSEPH F. PETERS, *Assistant Examiner.*

U.S. Cl. X.R.

352—78; 242—71.1

UNITED STATES PATENT OFFICE
CERTIFICATE OF CORRECTION

Patent No. 3,422,740                        January 21, 1969

Hubert Nerwin

It is certified that error appears in the above identified patent and that said Letters Patent are hereby corrected as shown below:

Column 2, line 64, after "magazine" insert -- provided with one form of maga- --.

Signed and sealed this 24th day of March 1970.

(SEAL)
Attest:

Edward M. Fletcher, Jr.                   WILLIAM E. SCHUYLER, JR.
Attesting Officer                            Commissioner of Patents